June 26, 1962   G. PETERSON   3,041,564
MEANS OF ANCHORING TRANSFORMER LEADS
Original Filed Sept. 28, 1956   2 Sheets-Sheet 1

INVENTOR.
Glen Peterson

June 26, 1962    G. PETERSON    3,041,564
MEANS OF ANCHORING TRANSFORMER LEADS
Original Filed Sept. 28, 1956    2 Sheets-Sheet 2

INVENTOR.
Glen Peterson

United States Patent Office 3,041,564
Patented June 26, 1962

3,041,564
MEANS OF ANCHORING TRANSFORMER LEADS
Glen Peterson, 540 S. 83rd East Ave., Tulsa, Okla.
Original application Sept. 28, 1956, Ser. No. 612,732, now Patent No. 2,964,722, dated Dec. 13, 1960. Divided and this application Dec. 12, 1960, Ser. No. 75,234
3 Claims. (Cl. 336—192)

This is a division of my co-pending patent application, Serial No. 612,732, filed September 28, 1956, now U.S. Patent No. 2,964,722.

This invention relates to electronic transformers and particularly to the variety known as toroids. Specifically, it relates to a means of mechanically terminating the windings placed on ring cores, and similar devices, and of fastening the leads thereto.

One of the dfliculties encountered in the manufacture of toroidal coils and transformers is that of fastening the terminal leads to the windings so that reliable electrical connections are made and can be maintained for long periods of time and through many rugged use cycles. It is also desirable that the methods and means used for electrically fastening the terminal leads to the windings be as inexpensive as possible.

Particularly are the difficulties multiplied when the windings are made of many turns of fine wire. Under this circumstance, it is desirable to anchor as many as possible of the terminal lead wires to the toroidal core and hence wind the windings over them. Using the method and means of my co-pending application, Serial No. 612,733, filed September 28, 1956, this can be done for all leads if the last winding is broken and applied from two directions and then spliced. When properly done this method avoids putting mechanical strains on any of the terminal lead connections and reliable joints which will stand up for long periods of time can be made. But it is expensive since it requires turning the toroid over in the winding machine at least once, or of having a winding machine which will wind in either directon; moreover, when this is done all of the terminal leads have to be carried by the core throughout the entire winding operation. This often slows down the winding process considerably and leads to other complications.

Still another difficulty is that of adequately insulating the connections made between windings and terminal leads. Usually, these connections are covered with insulating tape, and then taped down. Applying tape to such connections is a time consuming and costly operation. Too, simple soldered and taped connections often result in permitting mechanical strains to get to the connection with the consequent breaking of the winding wire near the point of connection.

Again, to reduce manufacturing costs the move is toward automatic, or at least semi-automatic winding machines. It is next to impossible to make an automatic winding machine if the terminal leads must be attached to the toroid before and/or while it is being wound. It is even undesirable to carry the loose ends of windings, and later fasten the leads to the loose windings after the winding operation has been completed, because the loose winding ends may foul the automatic machine or get covered up.

An object of this invention is to provide a simple reliable inexpensive means for terminating the windings of toroids and like devices and of attaching the leads thereto. A second objective is to provide a means such that pulling or yanking on the terminal leads does not exert strains on the winding terminations. A third objective is to provide a means for making terminal lead connections to toroids so that the toroids can be quickly and inexpensively wound in automatic and semi-automatic machines. A fourth objective is to provide a means of making terminal connections to toroids, and like devices, whereby the need of applying insulating pieces to cover the joint is avoided. These and other objects will become clear when reference is made to the drawing; wherein:

Figure 1:
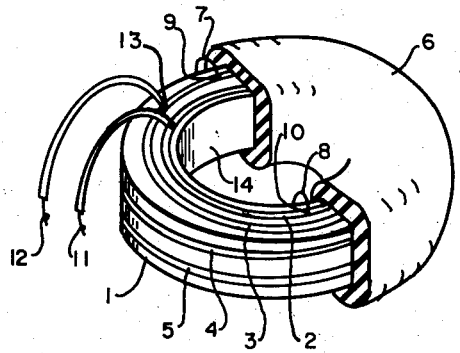
FIGURE 1 is an isometric view of a partially-wound toroidal coil which makes use of the invention.
Figure 6:
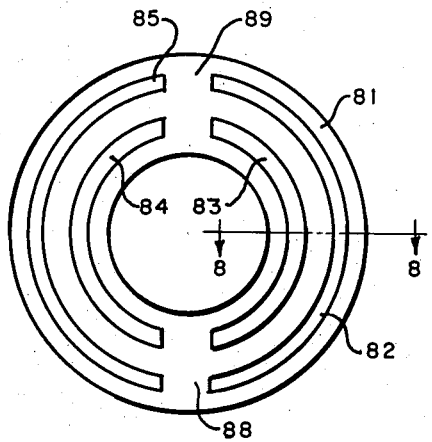
FIGURE 6 is a plan view of a terminal ring used in one form of my invention.

Referring to FIGURE 1 where the basic principles of the invention are disclosed, 1 is the ring core, 2, 3, 4 and 5 are terminating rings of conducting material which have been fastened to the core by some suitable means. For example, a box-like case of insulating material is made for the core proper and the conducting terminal rings attached thereto by one or other of the printed circuit technics. Alternatively, terminal rings are "printed" on thin rings of insulating material as illustrated by FIGURE 6, and these are, in turn, fastened to the core by means of tape or suitable adhesives. This is the method which was first used in practicing my invention and it has been found highly effective.

Continuing with FIGURE 1, 6 is a winding which has been partially cut away to show where winding end 7 has been attached to ring 3 and winding end 8 has been attached to ring 2. This has been done both with solder and by electric welding. 9 and 10 are the little "blobs" of solder or the weld joints. These connections, except possibly for the last, are preferably under the windings where they are well-protected, and the windings are applied to the entire core except for a very small region, usually where the clamp is applied to hold the core in the winding machine. It is in this small region that leads such as 11 and 12 are attached to rings 3 and 2, as shown at 13 and 14, after the toroid has been completely wound and removed from the machine.

It is seen that an inexpensive and reliable means of applying terminal leads to toroids, and like devices, has been accomplished, and that this means is compatible with automatic and semi-automatic winding machines. No loose ends of wire are ever left to foul the machine. When each winding is started, the operator solders or welds the beginning end of the winding to one of the rings. The machine is then put on automatic wind and continues until the winding has been finished. At that moment, an operator solders or welds the finishing end of the winding to another terminal ring. After the coil has been wound and removed from the machine, the terminal leads are attached to the terminal rings in regions where the winding has not been applied.

Figure 2:
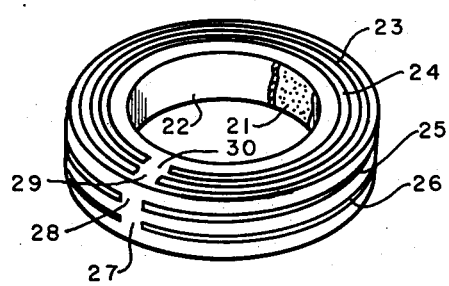
FIGURE 2 is an isometric view of a typical core to which the terminal means of this invention have been applied.

FIGURE 2 further shows some of the details of the prepared core before the winding has been applied. 23, 24, 25 and 26 are again the terminal rings. 22 is the insulating jacket of core 21 to which the rings are attached. 27, 28, 29 and 30 are gaps left in the rings for those applications where it is undesirable for one reason or another to have the rings continuous.

Figure 3:
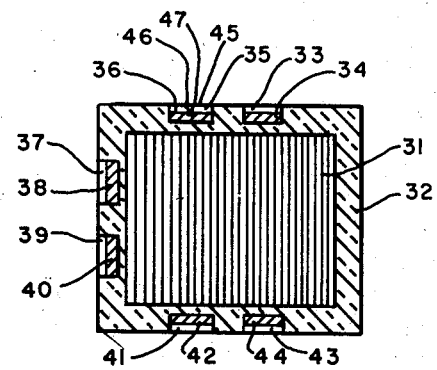
FIGURE 3 is a cross-section of a tape core with terminal means, illustrating the preferred form of my invention.

FIGURE 3 is a typical cross-section of a core illustrating the preferred form of my invention. In this case, terminal rings 34, 36, 38, 40, 42 and 44 are depressed in cavities 33, 35, 37, 39, 41 and 43, respectively, below the outside level of the insulating jacket 32 which contains them. When a typical wire of a winding such as 45, passes over the terminal rings, an insulating space is always left between the winding 45 and the rings 34, 36, 38, 40, 42 and 44. In this way any possible opportunity for faults between windings and terminal rings is avoided. However, even when the terminal rings and insulating jacket are level with each other, as in FIGURES 1 and 2, and as better shown in FIGURE 7, a small space is generally left between windings and terminal rings due to the fact that the winding tends to take a circular path about a rectangular core.

Figure 7:
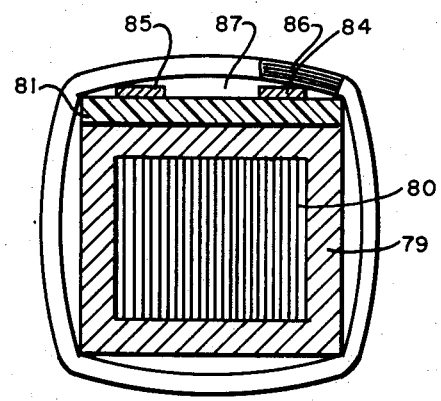
FIGURE 7 is a cross-section of a ring core and winding with the terminal ring of FIGURE 6 attached.
Figure 8:
FIGURE 8 is a typical cross-section of the terminal ring of FIGURE 6.
Figure 9:
FIGURE 9 is a cross-section of an alternative form which the terminal ring of FIGURE 6 can take.

FIGURE 7 is a typical cross-section of a core 80 which uses a single separate terminal ring, 81, of the variety shown in FIGURE 6. This separate terminal ring may be taped to the core at two or more places, prior to winding. After winding, the wire holds the terminal ring in place. It is seen in FIGURE 7 that, due to core and winding ring making a rectangular cross-section, the winding 86 makes a curved path over the winding ring leaving the insulating space 87 between winding and terminal rings or strips 84 and 85.

As shown by FIGURE 2, and again by FIGURE 6, the winding terminations which are printed or otherwise placed on the terminal rings or plates need not be complete rings. They may be broken at one or more places as may be desired. When broken at two places 88 and 89, FIGURE 6, four terminals are provided in the space previously used by two. Obviously, there may also be more than two breaks when more than four terminals are required in a limited space. Of course the more breaks that are provided in the terminal strips, the more gaps that may be required to be left in the winding to provide access to the terminal leads.

Figure 10:
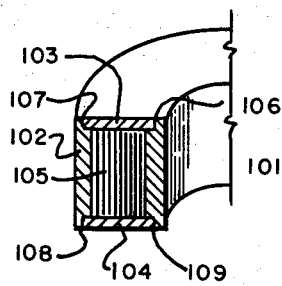
FIGURE 10 is an isometric view in quarter-section illustrating one method of fabricating a core box.

Core boxes of the type used in FIGURES 1 and 2 may be fabricated by cementing two or more insulating pieces together, as is already done commercially—except that in the present instance, the several pieces have one or more terminal rings fastened to them as before described. For example, a core box can be fabricated from an inner cylindrical piece, an outer cylindrical piece and two rings. The two cylindrical pieces and one ring are first cemented together, the core is then placed inside the cavity thus formed, and the second ring cemented to the cylindrical pieces as a lid. This is an arrangement which has been commercially used for several years and such materials are phenolic and nylon are often employed in making the core box. It is illustrated by FIGURE 10 where 101 and 102, respectively, are the inner and outer cylindrical pieces, 103 and 104 are the two ring pieces, 105 is the core, and 106 through 109 the cemented joints.

In the instance of my invention one or more of these core box pieces would carry the terminal rings. For example, the required core-box pieces can be fabricated from copper-clad insulating materials from which, except for the rings, the copper has been etched away. Again, the conducting copper or silver rings may be deposited on the insulating pieces as in the silk-screen process.

Continuing with FIGURE 3, 31 is the core proper, in this instance a tape core, 46 is a typical terminal end of a winding and is conductively fastened to ring 36 at 47. 32 is the core box which can be fabricated from two or more pieces, as before stated, but which for the sake of simplicity is here shown as one piece. 34, 36, 38, 40, and 42 are terminal rings of suitable conducting material, such as copper or silver, which have been deposited in the annular cavities 33, 35, 37, 39, 41 and 43 of the core box 32. As before stated, 45 is a typical wire of the winding which goes around core 31 and core box 32 without getting into contact with the terminal rings except where a connection is purposely made as at 47.

Figure 4:
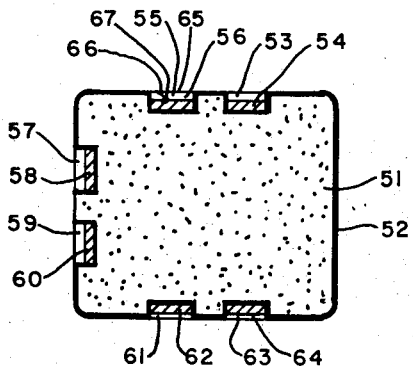
FIGURE 4 is similarly a cross-section of a powdered core with terminal means and also illustrating the preferred form of the invention.
Figure 11:
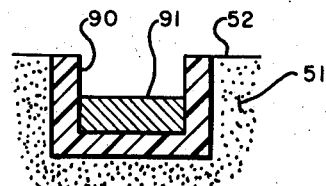
FIGURE 11 is a partial cross-section of a powdered core, greatly enlarged, to show how additional insulation between terminal ring and core may be provided.

FIGURE 4 illustrates an arrangement quite similar to FIGURE 3, except that the terminal rings 54, 56, 58, 60, 62 and 64 have been adapted to powdered iron cores. 51 is the powdered core proper which has been fabricated by the usual process of compression moulding of the powder and into which the annular cavities 53, 55, 57, 59, 61 and 63 have been moulded. 52 is a heavy layer of insulating enamel which has been placed over the entire exterior surface of the molded core including the ring cavities 53, 55, 57, 59, 61 and 63. After the insulating enamel has been baked on the core, or otherwise applied, the terminal rings 54 through 64 are deposited or placed in the ring cavities. Any one of many suitable deposition techniques may be employed or pre-fabricated rings may be pressed and/or cemented in the ring cavities. If desired, additional insulating material may be placed under one or more of the rings as might be required for high voltage applications. This is illustrated in FIGURE 11 where, as before, 51 is the powdered core material, and 52 the insulating varnish or enamel, and where 91 is the additional insulating material which has been pressed into the groove, and 91 is the conducting terminal ring. While expensive, "Teflon" or polytetrafluoroethylene, is a material well suited to the insulating ring 90. Particularly, is this true if the insulator 90 is made very slightly oversize and pressed into place. Obviously in both FIGURES 3 and 4, the terminal rings may be continuous or they may be broken as illustrated by FIGURES 2 and 6.

65, FIGURE 4, again shows a typical wire of the winding which passes over the ring cavities without coming into contact with the terminal rings except where a connection is purposely made from wire end 66, to ring 56. 67 represents a blob of solder or the burr of a welded joint.

Figure 5:
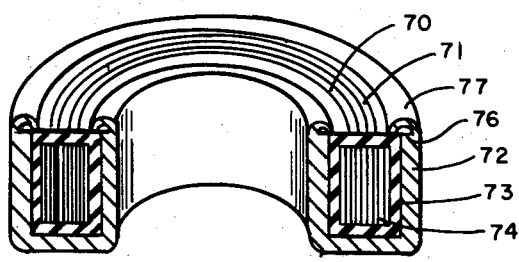
FIGURE 5 is an isometric view in half section illustrating an alternative means for accomplishing my invention.

FIGURE 5 illustrates the arrangements that are made when a metal core box 72 is used to enclose core 74. The metal portions of the box are of one-piece construction having a shoulder 76 on which the terminal plate 75 rests being held in place by the rolled-over edge 77 of the metal portion of the core box. Terminal plate 75 carries two or more terminal rings, as 70 and 71. 73 is cushioning material which helps support the core 74 inside the core box.

Obviously the terminal rings, so called because of the shape which they have first taken and may usually take, may assume many other shapes from complete rings, half rings, partial rings, to mere terminal patches. In the broadest sense these rings will be referred to as terminal surfaces, and it is understood that this invention can assume many forms and shapes, not specifically illustrated, and should be limited only by the appended claims.

I claim:

1. The means of terminating the windings placed on a closed path magnetic core in sound electrical and mechanically strong and durable connections, while said core is in a toroidal winding machine, comprising a closed magnetic core fabricated from powdered ferromagnetic particles which have been cemented together and compressed to form a closed ring, said fabricated core being provided with grooves in its exterior surfaces, said core including said grooves being generally covered with an insulating varnish, said grooves being provided with terminal rings of conducting material, the outermost portions of said terminal rings being generally below the outermost portions of said grooves, said terminal rings being adapted to receive and electrically connect at least two wire conductors, said core having at least one multi-turn winding of insulated filamentary conducting material wound thereon, the ends of which are conductively fastened to some of said terminal rings.

2. The means of terminating the windings placed on a closed path magnetic core, as in claim 1, said terminal rings being fastened to the bottoms of said grooves by means of adhesives.

3. The means of terminating the windings placed on a closed path magnetic core, as in claim 1, said terminal rings being deposited in said grooves.

No references cited.